US012774721B2

(12) United States Patent
Kokabu

(10) Patent No.: US 12,774,721 B2
(45) Date of Patent: Oct. 27, 2026

(54) DUAL PHASE DIFFERENCE PUMP

(71) Applicant: SHIMADZU CORPORATION, Kyoto (JP)

(72) Inventor: Takuya Kokabu, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 78 days.

(21) Appl. No.: 18/509,626

(22) Filed: Nov. 15, 2023

(65) Prior Publication Data

US 2024/0183405 A1 Jun. 6, 2024

(30) Foreign Application Priority Data

Dec. 5, 2022 (JP) ................................ 2022-194478

(51) Int. Cl.
*F16D 1/116* (2006.01)
*F04C 2/08* (2006.01)
*F16D 1/10* (2006.01)

(52) U.S. Cl.
CPC .............. *F16D 1/116* (2013.01); *F04C 2/084* (2013.01); *F16D 2001/103* (2013.01)

(58) Field of Classification Search
CPC .... F04C 2/08; F04C 2/084; F04C 2/18; F04C 11/001; F04C 15/0049; F04C 15/0065; F04C 15/0073; F04C 23/001; F04C 29/0042; F04C 29/0057; F04C 29/0071; F16D 1/116; F16D 2001/103
See application file for complete search history.

(56) References Cited

U.S. PATENT DOCUMENTS 2,751,846 A * 6/1956 Lapsley ................ F04C 11/001 418/196
2,881,710 A * 4/1959 Mclean ..................... F04C 5/00 418/154
(Continued)

FOREIGN PATENT DOCUMENTS

GB 2254376 A * 10/1992 ............ F04C 11/001
JP S6169489 A 5/1986
(Continued)

OTHER PUBLICATIONS

JP04-303190A—Kitano et al.—Phase Difference Pump—Oct. 27, 1992—the English Machine Translation. (Year: 1992).*
(Continued)

*Primary Examiner* — Essama Omgba
(74) *Attorney, Agent, or Firm* — Maier & Maier, PLLC

(57) ABSTRACT

A dual phase difference pump that can reduce the pulsation of a discharge pressure as much as possible. The dual phase difference pump includes, in series, two gear pump units each including a pair of gears configured to mesh with each other. Shafts of the gear pump units are coupled to each other by using a coupler. The pair of gears mesh with each other without backlash. The coupler is configured to couple the shafts to each other at any one of a plurality of predetermined phase angles, and is configured to make a phase difference between the gear pump units equal irrespective of which predetermined phase angle is selected among the plurality of predetermined phase angles as a phase angle at which the shafts are coupled to each other.

5 Claims, 7 Drawing Sheets

(56) References Cited

U.S. PATENT DOCUMENTS

| | | | | | |
|---|---|---|---|---|---|
| 2,931,302 | A | * | 4/1960 | Dlugos | F04C 15/0026 418/200 |
| 2,965,036 | A | * | 12/1960 | Wood | F04C 14/02 418/200 |
| 3,041,974 | A | * | 7/1962 | Judkins | F04C 11/001 418/200 |
| 3,101,673 | A | * | 8/1963 | Clark | F04C 2/18 418/200 |
| 4,195,480 | A | * | 4/1980 | Shelby | F04C 11/00 60/486 |
| 4,259,045 | A | * | 3/1981 | Teruyama | F04C 11/001 29/888.023 |
| 5,378,130 | A | * | 1/1995 | Ozeki | F04C 2/18 418/102 |

FOREIGN PATENT DOCUMENTS

| | | | |
|---|---|---|---|
| JP | 2611052 | B | 5/1997 |
| JP | 2001173574 | A | 6/2001 |

OTHER PUBLICATIONS

Office Action issued on Aug. 6, 2026, in corresponding Chinese Application No. 202311507662.3, 13 pages.

Office Action issued on Jul. 21, 2026, in corresponding Japanese Application No. 2022-194478, 7 pages.

* cited by examiner

DUAL PHASE DIFFERENCE PUMP

FIELD

The present invention relates to a dual phase difference pump in which two gear pump units are coupled to each other with a phase difference.

BACKGROUND

One object of this type of dual phase difference pump is to reduce the pulsation of a discharge pressure of a hydraulic liquid (hydraulic fluid). Shafts of drive gears constituting respective gear pump units are coupled to each other by using a spline coupling structure.

In the related art, as disclosed in JP 2611052 B2, the teeth of the gear portion of each drive gear and the teeth of the spline are worked (or machined) without relative alignment, and the phase difference between the gear pump units differs for each product in accordance with the difference in gear set and the meshing position of the spline coupling at the time of assembly.

The reason why the teeth of the gear portion and the teeth of the spline are not relatively aligned and working is performed depending on the situation is as follows: the working of the gear portion and the working of the spline are separately performed, and working including the adjustment to make the relative position constant is difficult; and the determination of the number of teeth of the gear and the number of teeth of the spline in an appropriate manner enables the pulsation to be smoothed without adjusting the relative position, which is comparable to the case where the adjustment is performed.

On the other hand, reducing backlash is also known technique for reducing pressure pulsation as disclosed in JP 2001-173574 A.

However, the inventors of the present invention have found that in the case of the backlash being set to substantially zero in order to further reduce the pressure pulsation, sufficient reduction of the pulsation is difficult to be achieved unless the phase difference between the gear pump units is accurately adjusted.

The related art employs a structure in which the positional relationship between the teeth of the gear portion and the teeth of the spline varies on a gear-by-gear basis due to dependency on the situation at the time of working. In this structure, the phase difference between the gear pump units can be made constant to a certain degree by selecting the meshing position between the male spline and the female spline at the time of assembly but cannot be prevented from varying to some extent. Thus, stabilization of quality is difficult to be achieved. This structure involves a process of selecting the meshing position, giving rise to another problem of deteriorating assembling efficiency.

When the backlash is set to substantially zero, an unexpected load tends to act on the teeth of the gear. The known structure includes a portion having a thin wall thickness at the gear portion. This may cause an unexpected deformation due to thermal expansion or the like, an unexpected load concentration due to the deformation, or the like, resulting in still another problem of difficulty in ensuring a sufficient strength.

PRIOR ART DOCUMENT

Patent Document

Patent Document 1: JP 2611052 B2

Patent Document 2: JP 2001-173574 A

SUMMARY

The present invention has been made to solve the above-described problems, and the intention of the present invention is to provide a dual phase difference pump that can reduce the pulsation of a discharge pressure as much as possible.

That is, a dual phase difference pump according to the present invention includes two gear pump units in series, the two gear pump units each including a pair of gears being configured to mesh with each other, and a shaft, the shafts of the two gear pump units being coupled to each other by using a coupler, in which the pair of gears mesh with each other without backlash, and the coupler is configured to couple the shafts to each other at any one of a plurality of predetermined phase angles, and is configured to make a phase difference between the two gear pump units equal irrespective of which predetermined phase angle is selected among the plurality of predetermined phase angles as a phase angle at which the shafts are coupled to each other.

The above configuration can prevent variation in phase difference between the gear pump units for each product, and can make the variation difference constant. Thus, the pulsation of the discharge pressure can be reduced together with the structure without backlash. Since the shafts may be coupled in any way, increase in burden in assembly can be avoided as well.

DETAILED DESCRIPTION

First Embodiment

Hereinafter, a dual phase difference pump 100 according to the present embodiment is described with reference to the drawings.

Figure 1:
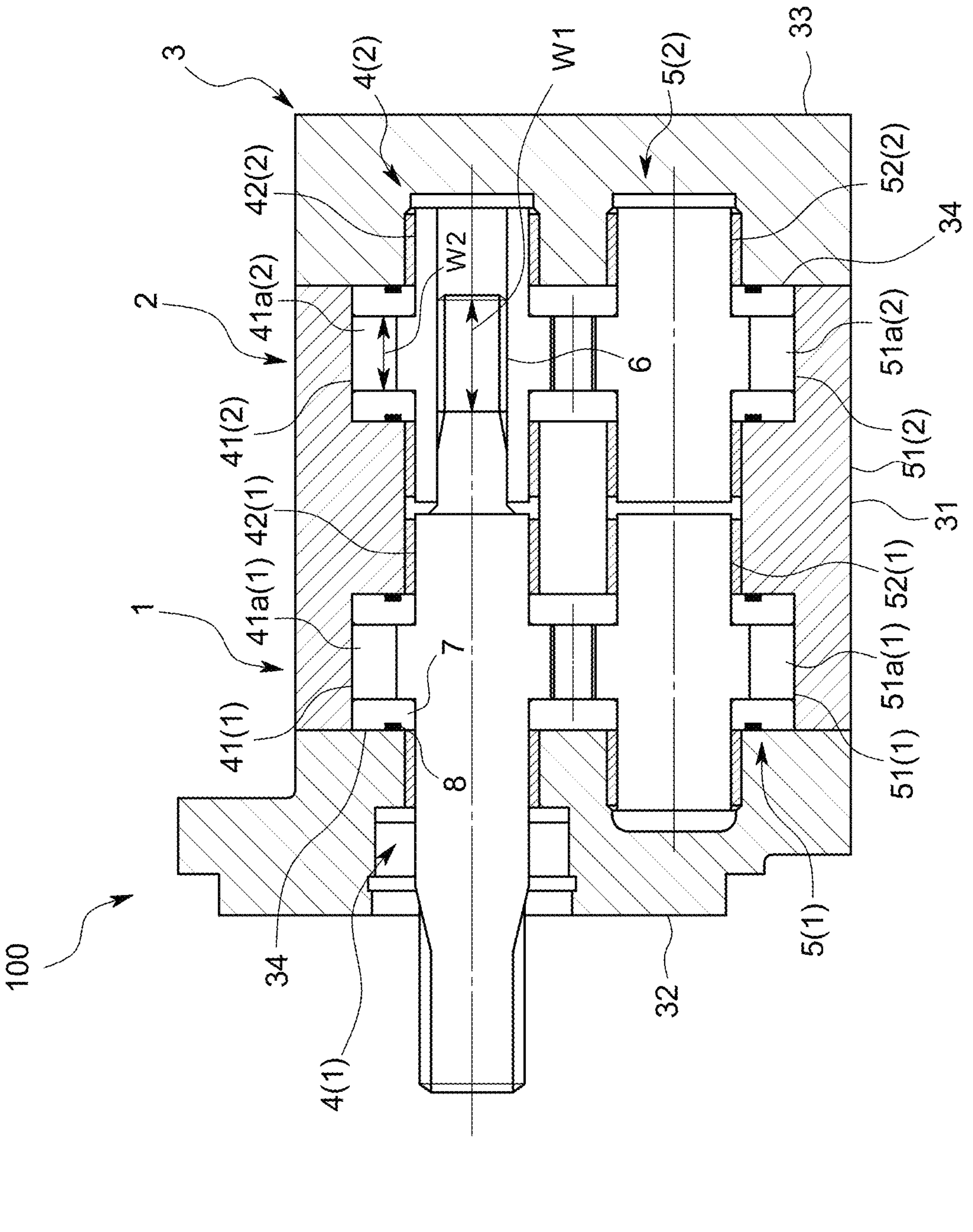
FIG. 1 is a longitudinal sectional view of a dual phase difference pump according to a first embodiment of the present invention.

As illustrated in FIG. 1, in the dual phase difference pump 100, a shared casing 3 houses two gear pump units 1, 2 coupled in the axial direction so as to rotate synchronously with a predetermined phase difference.

Hereinafter, one direction in the axial direction is referred to as a front side, the other direction is referred to as a rear side, the gear pump unit on the front side is referred to as a first gear pump unit 1, and the gear pump unit on the rear side is referred to as a second gear pump unit 2. In each of the gear pump units 1, 2, corresponding components are denoted by the same reference signs. When the necessity for distinguishing corresponding components arises, components belonging to the first gear pump unit 1 are denoted by adding (1) after the reference signs, and components belonging to the second gear pump unit 2 are denoted by adding (2) after the reference signs.

Each component is now described.

The casing 3 includes a body 31, a front cover 32, and a rear cover 33. The body 31 has a block shape. The front cover 32 and the rear cover 33 are respectively attached to front and rear end surfaces of the body 31. A pair of holes 34 having a spectacle-like shape (hereinafter, referred to as the "spectacle hole 34") is formed in each end surface of the body 31. The front cover 32 and the rear cover 33 covers openings of the spectacle hole 34.

The gear pump units 1, 2 each include a pair of gears meshing with each other, that is, a drive gear 4 and a driven gear 5. The gear 4, 5 includes a gear portion 41, 51 and a shaft 42, 52. The gear portion 41, 51 has a disc shape and includes a plurality of teeth 41*a*, 51*a* each formed at equal pitches in an outer peripheral portion. The shaft 42, 52 extends in both directions from a center of the gear portion 41, 51. The drive gear 4 and the driven gear 5 in each of the gear pump units 1, 2 have a substantially zero backlash. That is, one tooth 41*a* (51*a*) of one gear portion 41 (51) of the pair of gears is in constant contact with the two teeth 51*a* (41*a*) of the other gear portion 51 (41) of the pair of gears.

In the first gear pump unit 1, gear portions 41(1), 51(1) are housed in the front spectacle hole 34 of the body 31. Both sides of a shaft 42(1), 52(1) extending from the gear portion 41(1), 51(1) are respectively fitted to the bottom of the front spectacle hole 34 in the body 31 and the bearing hole formed in the front cover 32 with respective bushings interposed therebetween.

In the second gear pump unit 2, gear portions 41(2), 51(2) are housed in the rear spectacle hole 34 of the body 31. Both sides of a shaft 42(2), 52(2) extending from the gear portion 41(2), 51(2) are respectively fitted to the bottom of the rear spectacle hole 34 in the body 31 and the bearing hole formed in the rear cover 33 with respective bushings interposed therebetween.

Note that the reference sign "7" in the drawing denotes a side plate annexed to each of both side surfaces of the gear portions 41, 51, and reference sign "8" denotes a gasket that seals pressure to form a confining portion.

In the gear pump units 1, 2 having the above-described configuration, the drive shafts 42(1), 42(2) are coupled to each other by using a coupler 6. The gear pump units 1, 2 rotate synchronously with a predetermined phase difference y.

The coupler 6 can couple the drive shafts 42(1), 42(2) at any of a plurality of predetermined phase angles. Phase differences between the gear pump units 1, 2 are equal irrespective of which predetermined phase angle is selected among the plurality of predetermined phase angles as a phase angle at which the drive shafts 42(1), 42(2) are coupled to each other.

A specific description thereof is now given.

Here, a spline coupling structure is employed as the coupler 6.

Figure 2:
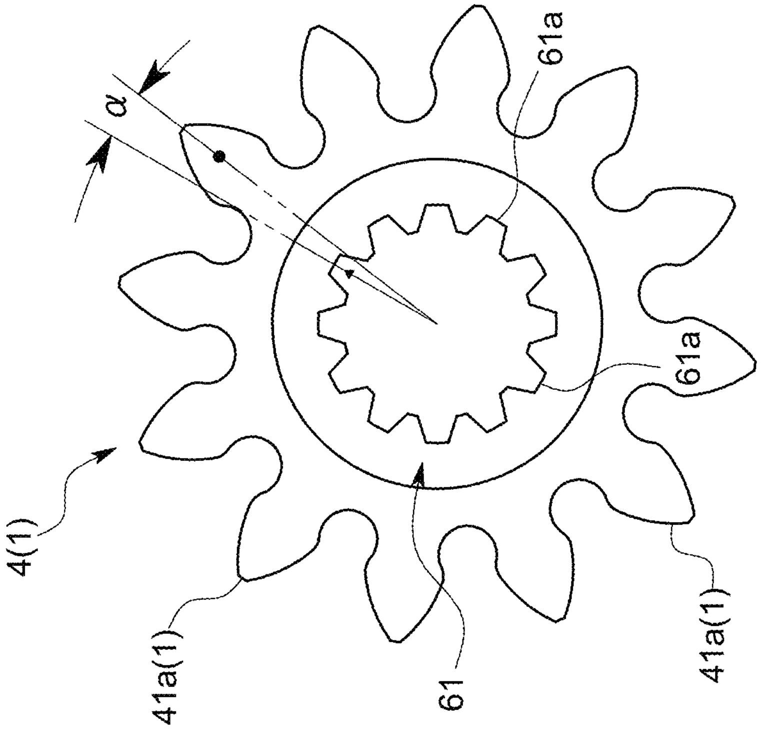
FIG. 2 is a view illustrating a drive gear and a male spline of a first gear pump unit in the first embodiment as viewed from the axial direction.
Figure 3:
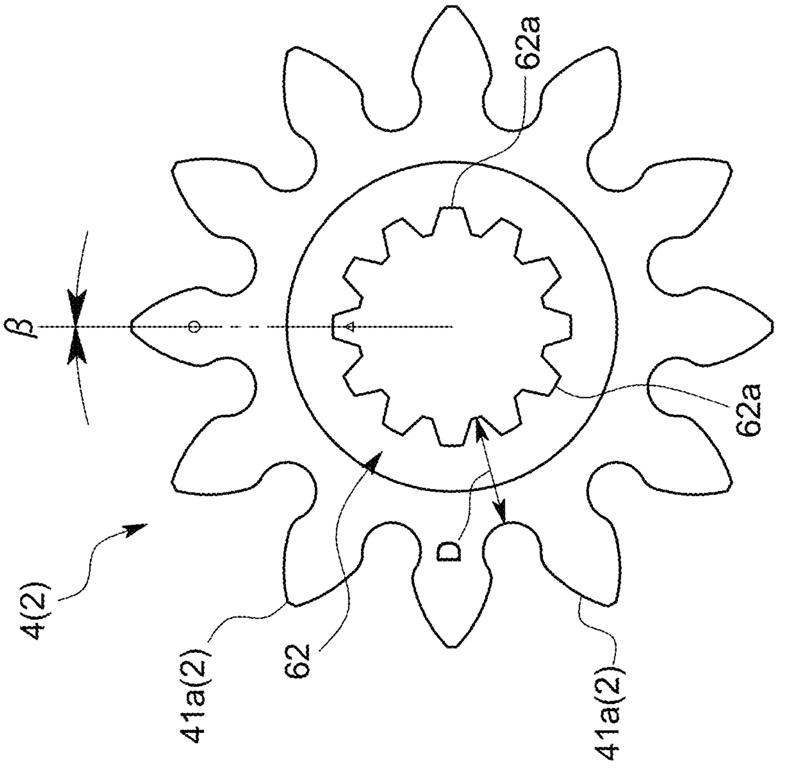
FIG. 3 is a view illustrating a drive gear and a female spline of a second gear pump unit in the first embodiment as viewed from the axial direction.

As illustrated in FIGS. 1 to 3, in the spline coupling structure, a male spline 61 and a female spline 62 are fitted without looseness. The male spline 61 is provided on the peripheral surface on the distal end side of the front drive shaft 42(1). The female spline 62 is provided on the inner peripheral surface of a through hole passing through the rear drive shaft 42(2) along the central axis of the rear drive shaft 42(2).

The distal end of an effective fitting range W1 in the axial direction of the male spline 61 with respect to the female spline 62 is set within a range that is the same as or further on the rear side than the side surface on the rear side of the gear portion 41(2) of the second gear pump unit 2. The proximal end of the fitting range W1 is set within a range that is the same as or further on the front side than the side surface on the front side of the gear portion 41(2). That is, when viewed from the direction orthogonal to the axial direction, the fitting range W1 of the male spline 61 with respect to the female spline 62 is set to include a range W2 of a face width of the gear portion 41(2) of the second gear pump unit 2.

Next, the relationship between the number of teeth of the spline 61, 62 and the number of teeth of the gear portion 41(1), 41(2), and the phase relationship between a tooth 61*a* or a tooth space 62*a* of the spline 61, 62 and a tooth 41*a*(1), 41*a*(2) of the gear portion 41(1), 41(2) is described with reference to FIGS. 2, 3, 4A, and 4B.

First, the relationship between the number of teeth of the spline 61, 62 and the number of teeth of the gear portion 41(1), 41(2) is described.

When the number of teeth of the spline 61, 62 is defined as m, and the number of teeth of the gear portion 41(1), 41(2) is defined as n, m is a divisor of n.

In this embodiment, the number n of teeth of the gear portion 41(1), 41(2) is 12, and the number m of teeth of the spline 61, 62 is equal thereto, that is, 12.

The number of teeth of the spline 61, 62 may be any number as long as the number of teeth is a divisor of 12, which is the number of teeth of the gear portion 41(1), 41(2). Thus, the number of teeth of the spline 61, 62 may be any one of 1, 2, 3, 4, and 6 in addition to 12.

Next, a phase relationship between the tooth 61*a* or the tooth space 62*a* of the spline 61, 62 and the tooth 41*a*(1), 41*a*(2) of the gear portion 41(1), 41(2) is described.

As illustrated in FIG. 2, when the tooth 61*a* of any one of the male splines 61 is set as a reference tooth (in the drawing, denoted by a black triangle), the absolute value of an angular difference between the reference tooth 61*a* and the tooth 41*a*(1) (in the drawing, denoted by a black circle) of the front drive gear 4(1) closest to the reference tooth 61*a* is defined as a.

As illustrated in FIG. 3, when the tooth space 62*a* of any one of the female splines 62 is set as a reference tooth space (in the drawing, denoted by a white triangle), the absolute value of an angular difference between the reference tooth space 62*a* and the tooth 41*a*(2) (in the drawing, denoted by a white circle) of the rear drive gear 4(2) closest to the reference tooth space 62*a* is defined as β.

In this case, a difference between α and β is a desired phase difference (absolute value thereof) γ between the gear pump units 1, 2. Here, the phase difference (absolute value thereof) γ between the gear pump units 1, 2 is ¼ of 30°, which is an angle between the gear teeth 41*a*, that is, 7.5°. Thus, α is 7.5° and β is 0°, for example.

In the case of such a configuration, the phase angle between the drive shafts 42(1), 42(2) in coupling is determined by the fitting combination of the tooth 61*a* of the male spline 61 and the tooth space 62*a* of the female spline 62. The drive shafts 42(1), 42(2) can be coupled in any phase angle, the number of whose patterns corresponds to the number of teeth of the spline, that is, 12.

Figure 4B:
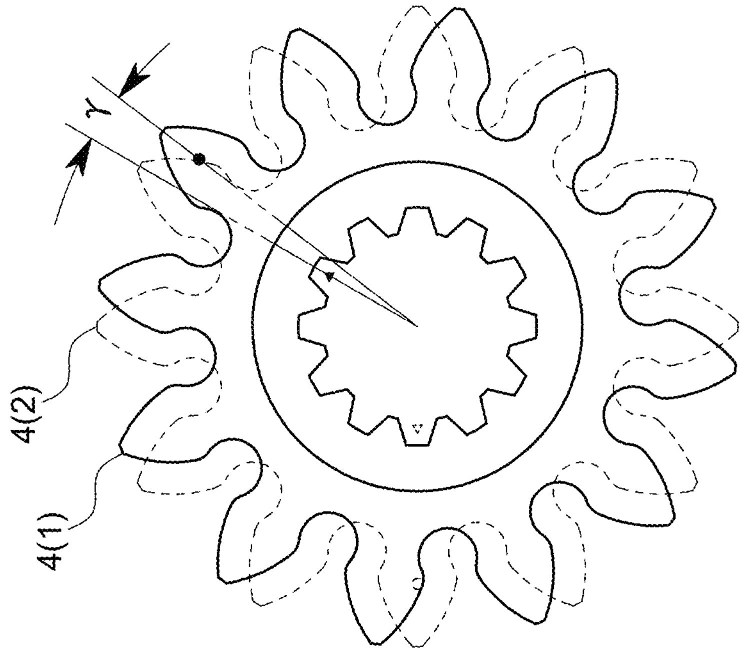
FIG. 4B is another view illustrating a phase difference between the first gear pump unit and the second gear pump unit provided by spline fitting in the first embodiment as viewed from the axial direction.
Figure 4A:
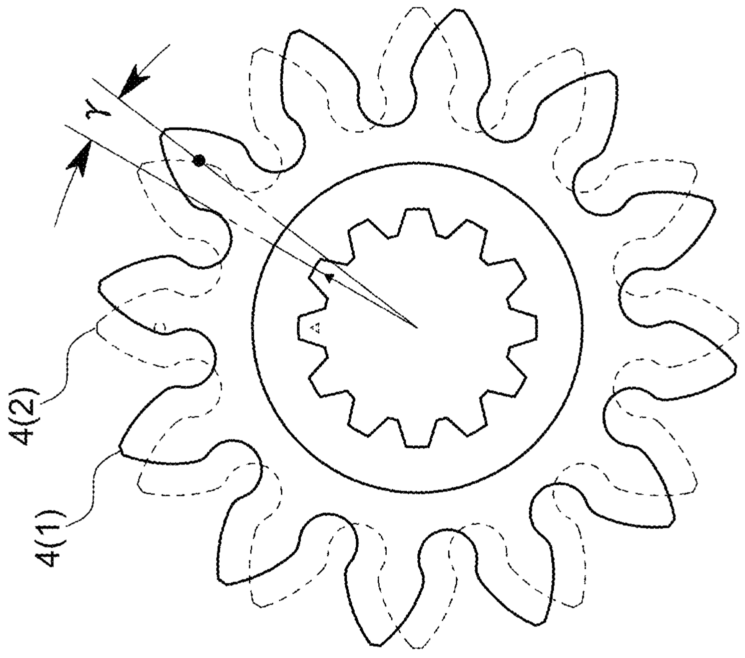
FIG. 4A is a view illustrating a phase difference between the first gear pump unit and the second gear pump unit provided by spline fitting in the first embodiment as viewed from the axial direction.

As illustrated in FIGS. 4A and 4B, the phase difference γ between the gear pump units 1, 2 is equally 7.5° irrespective of the phase angle at which the drive shafts 42(1), 42(2) are coupled.

As illustrated in FIG. 3, the number of tooth spaces of the female spline 62 and the number of teeth of the gear 4(2) are equal, and the tooth spaces 62*a* of the female spline 62 and the teeth 41*a*(2) of the gear 4 have the same phase, that is, the same angle. This structure allows the gear 4 to have a wall thickness being equal at each bottom land and a wall thickness D at the bottom land of the gear 4 to be the largest. Thus, the maximum strength can be ensured.

Second Embodiment

Figure 5:
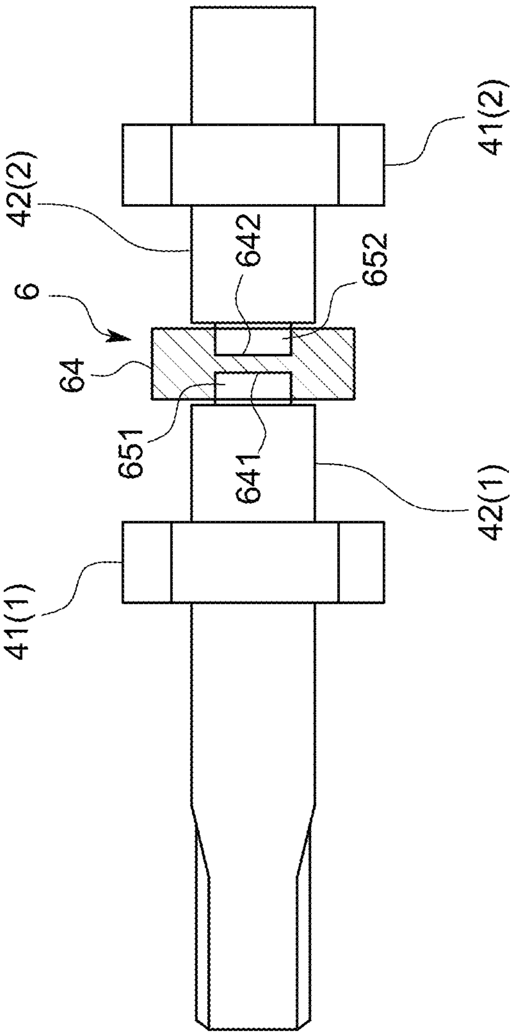
FIG. 5 is a view illustrating a state in which drive gears according to a second embodiment of the present invention are coupled to each other by a coupler as viewed from a direction orthogonal to the axial direction.
Figure 6:
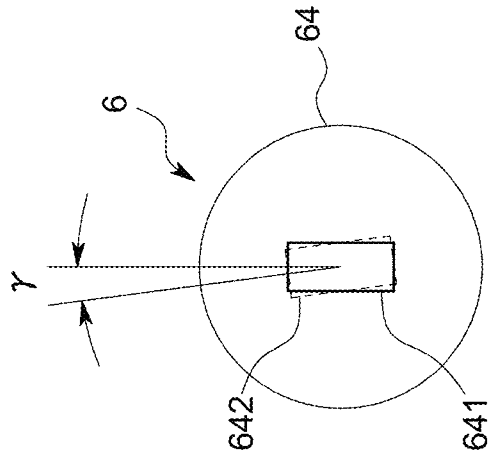
FIG. 6 is a view illustrating a coupling member in the second embodiment as viewed from the axial direction.

In this embodiment, as illustrated in FIGS. 5 and 6, a coupling member 64 interposed between the front drive shaft 42(1) and the rear drive shaft 42(2) is used as the coupler 6.

Specifically, the coupling member 64 has, for example, a disk shape. One end surface of the coupling member 64 includes a recessed first engaged portion 641. The first engaged portion 641 is engaged with a protruding first engaging portion 651 without looseness in the rotational direction. The first engaging portion 651 is formed at the end of the front drive shaft 42(1). The other end surface includes a recessed second engaged portion 642. The second engaged portion 642 is engaged with a protruding second engaging portion 652 without looseness in the rotational direction. The second engaging portion 652 is formed at the end of the rear drive shaft 42(2). The first engaging portion 651 and the first engaged portion 641 are engaged with each other, and the second engaging portion 652 and the second engaged portion 642 are engaged with each other to form a coupler.

Figure 7B:
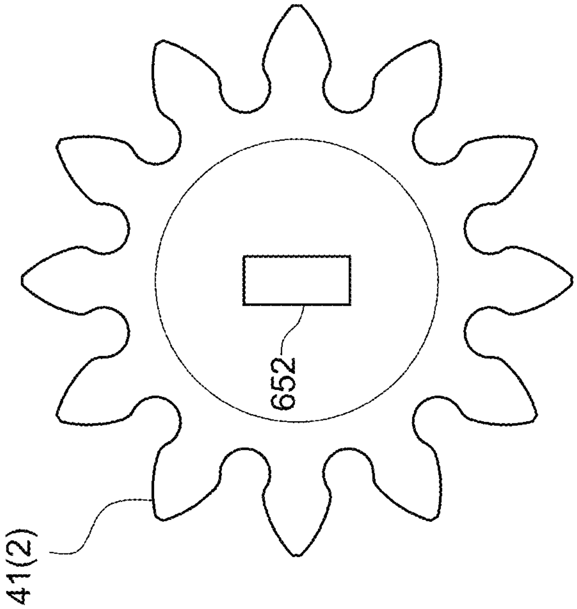
FIG. 7B is another view illustrating the drive gears in the second embodiment as viewed from the axial direction.
Figure 7A:
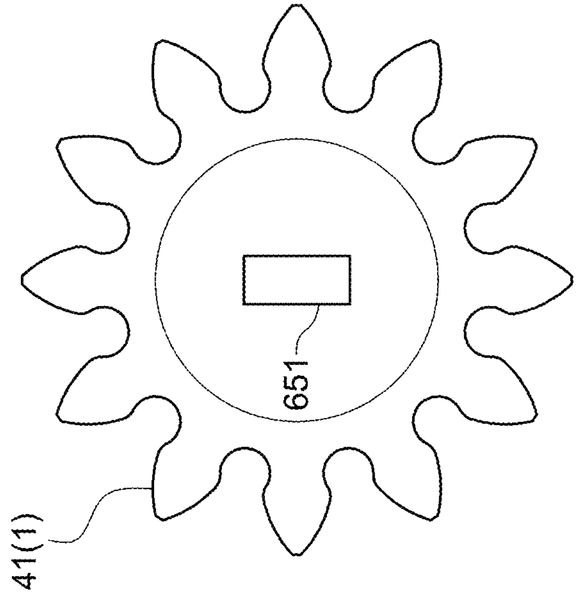
FIG. 7A is a view illustrating the drive gears in the second embodiment as viewed from the axial direction.

The engaging portion 651, 652 and the engaged portion 641, 642 have a linear band shape as viewed from the axial direction. Here, as illustrated in FIG. 6, the angles as viewed from the axial direction of the engaged portions 641, 642 provided in the coupling member 64 are made different. The angle difference is set to be the desired phase difference γ between the gear pump units 1, 2. On the other hand, as illustrated in FIGS. 7A and 7B, the relative angles of the engaging portions 651, 652 with respect to the gear portions 41(1), 41(2) as viewed from the axial direction are respectively matched with each other.

In the above configuration, the number of possible patterns for the phase angle between the drive shafts 42(1), 42(2) in coupling is two (0° and 180°). The phase differences between the gear pump units 1, 2 are equal, and the desired phase difference γ is obtained in both phase angles at which the drive shafts 42(1), 42(2) are coupled.

Note that the angles of the engaged portions provided in the coupling member as viewed from the axial direction may be matched, whereas the relative angles of the respective engaging portions provided in the drive shafts with respect to the respective gear portions as viewed from the axial direction may be made different. This approach may be adopted to set the angle difference to be a desired phase difference between the gear pump units.

The protrusion-recess relationship between the engaging portion and the engaged portion may be reversed. The shape of the engaging portion and the engaged portion are not limited to a linear band shape as viewed from the axial direction, and may have a cross shape or the like, or may have a spline coupling structure.

In the above embodiment, the phase difference of each gear pump unit is ¼ of a tooth-to-tooth angle of the gear, but may be ½, or may be set to a value exceeding zero and less than ½, for example, ⅓.

The coupler couples the drive shafts to each other, but may couple the driven shafts to each other. In the spline coupling structure, the distal end thereof does not have to extend to the gear portion on the rear side, and coupling may made at a shallower position than the gear portion.

In addition, the present invention is not limited to the embodiments described above, and various modifications can be made without departing from the spirit of the present invention.

<Supplement>

Features of the above-described configuration are summarized as follows.

[1] A dual phase difference pump 100 including two gear pump units 1, 2 in series, the two gear pump units 1, 2 each including a pair of gears 4, 5 being configured to mesh with each other, and a shaft 42, the shafts 42 of the two gear pump units 1, 2 being coupled to each other by using a coupler 6, in which the pair of gears 4, 5 mesh with each other without backlash, and the coupler 6 is configured to couple the shafts 42 to each other at any one of a plurality of predetermined phase angles, and is configured to make a phase difference between the two gear pump units 1, 2 equal irrespective of which predetermined phase angle is selected among the plurality of predetermined phase angles as a phase angle at which the shafts 42 are coupled to each other.

Such a configuration can prevent variation in phase difference between the gear pump units 1, 2 for each product and make the phase difference constant. Thus, the pulsation of the discharge pressure can be reduced together with the structure without backlash. Since the shafts 42 may be coupled in any way, increase in burden in assembly can be avoided as well.

[2] The dual phase difference pump 100 according to [1], in which the coupler 6 includes a spline coupling structure including a male spline 61 and a female spline 62, the male spline 61 being fitted to the female spline 62, the male spline 61 being provided at one shaft 42, the female spline 62 being provided at another shaft 42, the one shaft 42 and the other shaft 42 being coupled to each other, each of the pair of gears 4, 5 includes a gear portion 41, 51, and m is a devisor of n, where n represents the number of teeth 41*a*, 51*a* of the gear portion 41, 51, and m represents the number of teeth 61*a* and tooth spaces 62*a* of the spline coupling structure.

This configuration can provide the configuration according to [1] while the spline coupling structure is used.

More specifically, α and β may have an angle difference that is the phase difference y between the gear pump units 1, 2, where a represents an angular difference between one tooth 61*a* serving as a reference in the male spline 61 and the tooth 41*a*, 51*a* of one gear closest to the one tooth 61*a*, and β represents an angular difference between one tooth space 62*a* serving as a reference in the female spline 62 and the tooth 41*a*, 51*a* of the other gear closest to the one tooth space 62*a*.

[3] The dual phase difference pump 100 according to [1] or [2], in which the coupler 6 includes a spline coupling structure including a male spline 61 and a female spline 62, the male spline 61 being fitted to the female spline 62, the male spline 61 being provided at one shaft 42, 52, the female spline 62 being provided at another shaft 42, 52, the one shaft 42, 52 and the other shaft 42, 52 being coupled to each other, the gear 4 including the female spline 62 has a wall thickness being equal at each bottom land.

This configuration allows the wall thicknesses of the gear 4 to be equal and the load to be evenly distributed to the teeth 41*a* of the gear 4. Thus, this configuration can ensure sufficient strength even when the backlash is set to substantially zero.

More specifically, as illustrated in FIG. 3, the largest wall thickness D at a bottom land of the gear 4 can be ensured, and thus the largest strength can be ensured as long as the number of tooth spaces of the female spline 62 and the number of teeth of the gear 4(2) are equal, and the tooth spaces 62*a* of the female spline 62 and the tooth 41*a*(2) of the gear 4 have the same phase, that is, the same angle.

[4] The dual phase difference pump 100 according to [2] or [3], in which, as viewed from a direction orthogonal to an axis, the male spline 61 is fitted with respect to the female spline 62 within a range being set to include a range of a face width of a gear 4(2) including the female spline 62.

This configuration can reduce possible torsion, enhance the strength, and reduce misalignment of the phase difference between the gear pump units 1, 2.

[5] The dual phase difference pump 100 according to [1], in which the coupler 6 includes a coupling member 64 provided between the shafts 42(1), 42(2), the coupling member 64 being configured to couple the shafts 42(1), 42(2).

The above-described structure using the coupling member 64 is effective for the case where the spline coupling structure is difficult to be provided.

[6] The dual phase difference pump 100 according to any one of [1] to [5], in which the phase difference between the two gear pump units 1, 2 is set to ¼ of a tooth-to-tooth angle of the gear 4.

Such a configuration can effectively reduce the pulsation of the discharge pressure as compared with configurations with other phase differences.

REFERENCE SIGNS LIST

100 Dual phase difference pump
1, 2 Gear pump unit
6 Coupler
4.5 Gear
42.52 Shaft
61 Male spline
62 Female spline
D Wall thickness of gear
W1 Fitting range of spline
W2 Range of face width of gear
61 Coupling member

What is claimed is:

1. A dual phase difference pump for reducing pressure pulsation during operation of the dual phase difference pump, the dual phase difference pump comprising two gear pump units in series, the two gear pump units each including a pair of gears being configured to mesh with each other, and a shaft, the shafts of the two gear pump units being coupled to each other by using a coupler, wherein the pair of gears mesh with each other without backlash, the coupler includes a spline coupling structure including a male spline and a female spline, the male spline being fitted to the female spline, the male spline being provided at one shaft, the female spline being provided at another shaft, the one shaft and the other shaft being coupled to each other, wherein the spline coupling structure has a first number of teeth m;

each of the pair of gears includes a gear portion, wherein each of the pair of gears has a second number of teeth n, wherein m is a divisor of n, the coupler is configured to couple the shafts to each other at any one of a plurality of predetermined phase angles, wherein the coupler is configured to couple the shafts to each other in the plurality of predetermined phase angles only in configurations wherein a phase difference between the two gear pump units is equal, irrespective of which predetermined phase angle is selected among the plurality of predetermined phase angles as a phase angle at which the shafts are coupled to each other, and wherein α and β have an angle difference that is the phase difference between the two gear pump units, where α represents an angle difference between one tooth serving as a reference in the male spline and a tooth of one gear of the pair of gears closest to the one tooth, and β represents an angle difference between one tooth space serving as a reference in the female spline and a tooth of another gear of the pair of gears closest to the one tooth space.

2. The dual phase difference pump according to claim 1, wherein, as viewed from a direction orthogonal to an axis, the male spline is fitted with respect to the female spline within a range being set to include a range of a face width of a gear of the pair of gears including the female spline.

3. A dual phase difference pump comprising two gear pump units in series, the two gear pump units each including a pair of gears being configured to mesh with each other, and a shaft, the shafts of the two gear pump units being coupled to each other by using a coupler, wherein the pair of gears mesh with each other without backlash, the coupler is configured to couple the shafts to each other at any one of a plurality of predetermined phase angles, and is configured to make a phase difference between the two gear pump units equal irrespective of which predetermined phase angle is selected among the plurality of predetermined phase angles as a phase angle at which the shafts are coupled to each other, the coupler includes a spline coupling structure including a male spline and a female spline, the male spline being fitted to the female spline, the male spline being provided at one shaft, the female spline being provided at another shaft, the one shaft and the other shaft being coupled to each other, a gear of the pair of gears including the female spline has a wall thickness being equal at each bottom land, and wherein α and β have an angle difference that is the phase difference between the two gear pump units, where α represents an angle difference between one tooth serving as a reference in the male spline and a tooth of one gear of the pair of gears closest to the one tooth, and β represents an angle difference between one tooth space serving as a reference in the female spline and a tooth of another gear of the pair of gears closest to the one tooth space.

4. The dual phase difference pump according to claim 3, wherein a number of tooth spaces of the female spline is equal to the number of teeth of the gear, and the tooth spaces of the female spline and the teeth of the gear are identical in angle to each other.

5. A dual phase difference pump comprising two gear pump units in series, the two gear pump units each including a pair of gears being configured to mesh with each other, and a shaft, the shafts of the two gear pump units being coupled to each other by using a coupler, wherein the pair of gears mesh with each other without backlash, the coupler is configured to couple the shafts to each other at any one of a plurality of predetermined phase angles, and is configured to make a phase difference between the two gear pump units equal irrespective of which predetermined phase angle is selected among the plurality of predetermined phase angles as a phase angle at which the shafts are coupled to each other, wherein the phase difference between the two gear pump units is set to 1/4 of a tooth-to-tooth angle of a gear of the pair of gears, and wherein α and β have an angle difference that is the phase difference between the two gear pump units, where α represents an angle difference between one tooth serving as a reference in the male spline and a tooth of one gear of the pair of gears closest to the one tooth, and β represents an angle difference between one tooth space serving as a reference in the female spline and a tooth of another gear of the pair of gears closest to the one tooth space.

* * * * *